(No Model.)

F. T. WARBURTON.
ART OF TYING COTTON BALES AND APPLIANCE THEREFOR.

No. 372,188. Patented Oct. 25, 1887.

WITNESSES:
John F. Nelson.
Emma Arthur.

INVENTOR
Frederick T. Warburton,
BY
ATTORNEYS

UNITED STATES PATENT OFFICE.

FREDERICK T. WARBURTON, OF NEWPORT NEWS, VIRGINIA.

ART OF TYING COTTON-BALES AND APPLIANCE THEREFOR.

SPECIFICATION forming part of Letters Patent No. 372,188, dated October 25, 1887.

Application filed July 26, 1887. Serial No. 245,347. (No model.)

*To all whom it may concern:*

Be it known that I, FREDERICK TYNTE WARBURTON, a subject of the Queen of Great Britain, residing at Newport News, county of Warwick, and State of Virginia, have invented certain new and useful Improvements in the Art of Tying Cotton-Bales and Appliances Therefor, of which the following is a specification.

The object of this invention is to retain, as completely as possible, the result of compression in bales of cotton and other material. This is effected by the use of a new tie and a new arrangement of the bands of hoop-iron and other material.

The bands, instead of being used as at present, each in one piece of sufficient length to extend completely around the bale, are divided into two sections. The upper section is held by small spring-catches on the surface of the upper platen and compressed with the bale of cotton, thus dispensing with the customary grooves in the face of the upper platen. The lower section of the band is passed through the grooves in the face of the lower platen, and its upturned extremities are tied on each side of the bale to downturned ends of the upper section. The ties consist of interlocking hooks on the meeting ends of the band-sections, which are secured by simple oblong buckles or keepers slipping over them, as hereinafter described.

Figure 1:
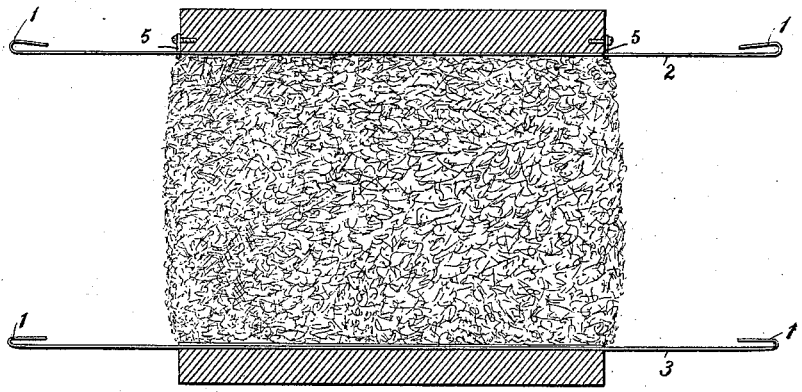
Figure 2:
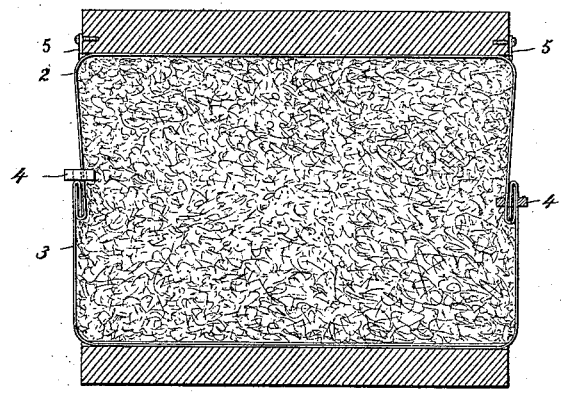
Figure 5:
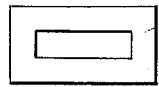
Figure 4:
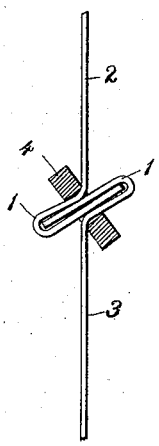
Figure 3:
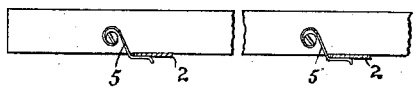

Referring to the accompanying drawings, which form a part of this specification, Figure 1 represents a partial section of the upper and lower platens of the press, with a compressed bale between them, and the bands in their first position before bending around the bale. Fig. 2 is a similar view showing the band-sections interlocked, with the keeper or buckle applied on one side and ready for application on the other side. Fig. 3 is a front view of the upper platen, showing the upper band-sections in transverse section and suitable springs by which they are supported in position against the face of the platen. Fig. 4 is a detail view showing the form of tie when completed. Fig. 5 is a face view of the keeper.

The meeting ends of the band-sections are tied in the following manner: Each end is bent over about one inch (more or less) to form a simple hook, 1, as illustrated, at the extremities of the upper band-section, 2, (shown in Fig. 1,) and similar hooks are formed on the ends of the lower band-sections, 3, the bend of the hook being sufficiently wide to permit the ends to hook freely into each other, as illustrated in Fig. 2. When in this position, a buckle or keeper, 4, having a slot with parallel sides, and having been previously slipped over one of the meeting ends before they are brought together, is now slipped over the joint formed by the interlocked hooks, as illustrated in Fig. 2, and is retained in its position by friction. The bend or loop at the lower extremity of the upper band-section, being somewhat wider than that at the upper end of the lower band-section, permits the buckle or keeper to slip over the latter, but prevents it passing more than one-half way over the joint formed by the interlocked hooks. When the pressure is removed from the bale and the cotton expands, the buckle assumes the oblique position shown in Fig. 4, so that the projecting interlocked hooks form a shoulder on each side of the keeper, preventing it slipping in either direction, while the keeper effectually prevents the opening or spreading of the hooks, and a secure tie is thus produced.

In operating my invention the upper band-section is placed in position on the under surface of the platen and held by spring-catches 5, of any suitable form. A simple and effective form of catch for this purpose is illustrated in Fig. 3, consisting of helical springs of wire, one for each band, applied to the front vertical side, and one to the rear vertical side, of the platen, the ends of said springs being formed to project horizontally, as shown, so that the bands can be slipped between them and the face of the platen, and will be supported in this position. The bale is then compressed, the projecting ends of the upper band-sections are bent down, the springs 5 yielding and escaping from the bands, after which said springs resume their normal position, in readiness for the next operation. A suitable gage being quickly passed through the grooves in the face of the lower platen and turned up to the hook-formed ends of the upper band-sections, the required length of the lower band-sections is instantly ascertained. The lower band-sections having been prepared in all necessary lengths, in grades of one inch, the proper length is selected, passed through the grooves of the lower platen, turned up, interlocked with the ends of the upper band-sections, the buckles slipped in place over the joint thus formed, and the bale released from the press.

It will be observed that the use of the bands in two sections obviates the necessity of drawing their ends together with great force against the friction between the bale and the platen; and by dispensing with the grooves in the upper platen, which, as ordinarily used, are filled with bulging cotton, the amount of slack taken up by the bale when it is released is much reduced.

Having thus described my invention, the following is what I claim as new therein and desire to secure by Letters Patent:

1. The combination of the bands 2 3, having interlocked hooks 1, and the oblong encircling keeper 4, slipped over said interlocked hooks and adapted to be thrown into oblique position by the strain of the bands when released from the press, as explained.

2. The method of tying cotton-bales, which consists in first compressing with the bale one part or section of each band, then inserting through grooves in the opposite platen complementary band-sections of selected length, to overlap the downturned ends of the first, and afterward tying the said overlapping ends together by means of a buckle or keeper, substantially as herein described.

FREDK. T. WARBURTON.

Witnesses:
HERBERT KNIGHT,
F. A. HOPKINS.